US010268376B2

(12) United States Patent
Kazi et al.

(10) Patent No.: US 10,268,376 B2
(45) Date of Patent: Apr. 23, 2019

(54) AUTOMATED DEPLOYMENT AND ASSIGNMENT OF ACCESS DEVICES IN A DISPERSED STORAGE NETWORK

(71) Applicant: International Business Machines Corporation, Armonk, NY (US)

(72) Inventors: Asimuddin Kazi, Naperville, IL (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 15/436,983

(22) Filed: Feb. 20, 2017

(65) Prior Publication Data

US 2017/0160945 A1 Jun. 8, 2017

Related U.S. Application Data

(63) Continuation-in-part of application No. 15/058,408, filed on Mar. 2, 2016, now Pat. No. 10,037,171.
(Continued)

(51) Int. Cl.
*G06F 11/00* (2006.01)
*G06F 3/06* (2006.01)
(Continued)

(52) U.S. Cl.
CPC ............ *G06F 3/0605* (2013.01); *G06F 3/064* (2013.01); *G06F 3/067* (2013.01); *G06F 3/0619* (2013.01);
(Continued)

(58) Field of Classification Search
CPC ....... G06F 3/0605; G06F 3/0619; G06F 3/064
See application file for complete search history.

(56) References Cited

U.S. PATENT DOCUMENTS 4,092,732 A * 5/1978 Ouchi ................. G06F 11/1076
714/5.11
4,493,081 A * 1/1985 Schmidt ............... G06F 11/106
714/754
(Continued)

OTHER PUBLICATIONS

Shamir; How to Share a Secret; Communications of the ACM; vol. 22, No. 11; Nov. 1979; pp. 612-613.
(Continued)

*Primary Examiner* — Esaw T Abraham
(74) *Attorney, Agent, or Firm* — Garlick & Markison; Tomothy W. Markison; H. Shannon Tyson, Jr.

(57) ABSTRACT

Methods for use in a dispersed storage network (DSN) to automate deployment and assignment of access devices. In various examples, a managing unit of the DSN obtains configuration and capability information relating to various DSN devices (e.g., storage units). The managing unit further identifies a common class of user devices that share substantially identical DSN engagement characteristics. Based on one or more of the DSN configuration information, the DSN capability information, and the substantially identical DSN engagement characteristics, the managing unit selects a memory access unit to associate with the identified common class of user devices, and facilitates utilization of the selected memory access unit by the identified common class of user devices. The configuration information may include, for example, a DSN asset list, an expected user device list, system topology information, and DSN asset capability information. The capability information may include access, process, storage, and capacity performance information.

20 Claims, 6 Drawing Sheets

Related U.S. Application Data (60) Provisional application No. 62/154,886, filed on Apr. 30, 2015.

(51) Int. Cl.
*H04L 29/08* (2006.01)
*G06F 11/10* (2006.01)

(52) U.S. Cl.
CPC ........ *G06F 3/0629* (2013.01); *G06F 11/1076* (2013.01); *H04L 67/1097* (2013.01); *G06F 2211/1028* (2013.01)

(56) References Cited

U.S. PATENT DOCUMENTS

| | | | |
|---|---|---|---|
| 5,454,101 A * | 9/1995 | Mackay | G06F 17/30952 |
| 5,485,474 A | 1/1996 | Rabin | |
| 5,774,643 A * | 6/1998 | Lubbers | G06F 11/1076 711/114 |
| 5,802,364 A | 9/1998 | Senator et al. | |
| 5,809,285 A | 9/1998 | Hilland | |
| 5,890,156 A * | 3/1999 | Rekieta | G06F 9/50 707/610 |
| 5,987,622 A * | 11/1999 | Lo Verso | G06F 11/1076 714/6.1 |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF NetworkWOrking Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working—Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 5511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Confer- (56) References Cited

OTHER PUBLICATIONS ence on Architectural Support for Programming Languages and Operating Systems (ASPLOS 2000); Nov. 2000; pp. 1-12.

* cited by examiner

AUTOMATED DEPLOYMENT AND ASSIGNMENT OF ACCESS DEVICES IN A DISPERSED STORAGE NETWORK

CROSS-REFERENCE TO RELATED APPLICATIONS

The present U.S. Utility Patent Application claims priority pursuant to 35 U.S.C. § 120 as a continuation-in-part of U.S. Utility application Ser. No. 15/058,408, entitled "ACCESSING COMMON DATA IN A DISPERSED STORAGE NETWORK", filed Mar. 2, 2016, now issued as U.S. Pat. No. 10,037,171, which claims priority pursuant to 35 U.S.C. § 119(e) to U.S. Provisional Application No. 62/154,886, entitled "BALANCING MAINTENANCE AND ACCESS TASKS IN A DISPERSED STORAGE NETWORK", filed Apr. 30, 2015, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks, and more particularly to automated deployment and assignment of access devices in a dispersed storage network.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

DETAILED DESCRIPTION OF THE INVENTION

Figure 1:
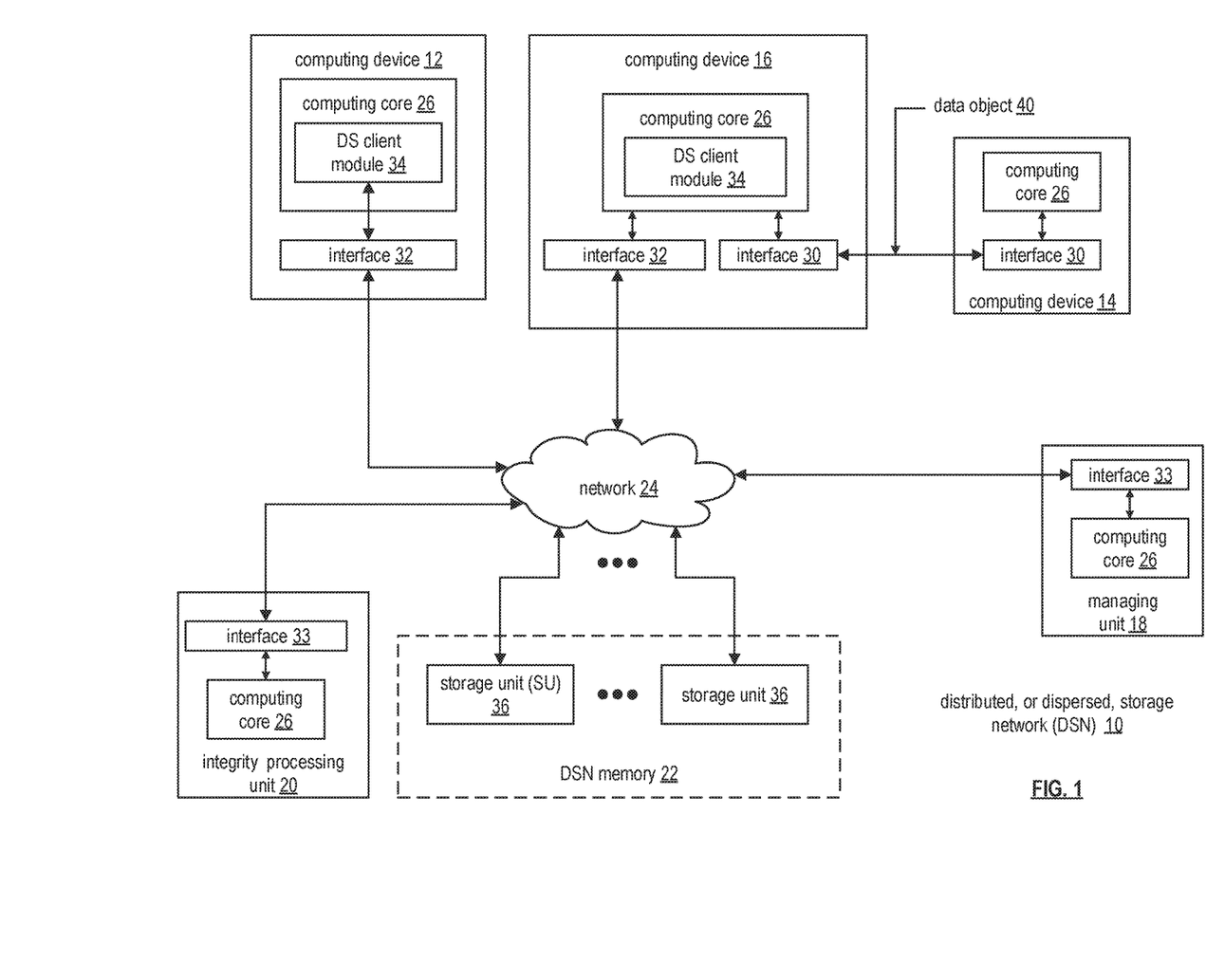
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
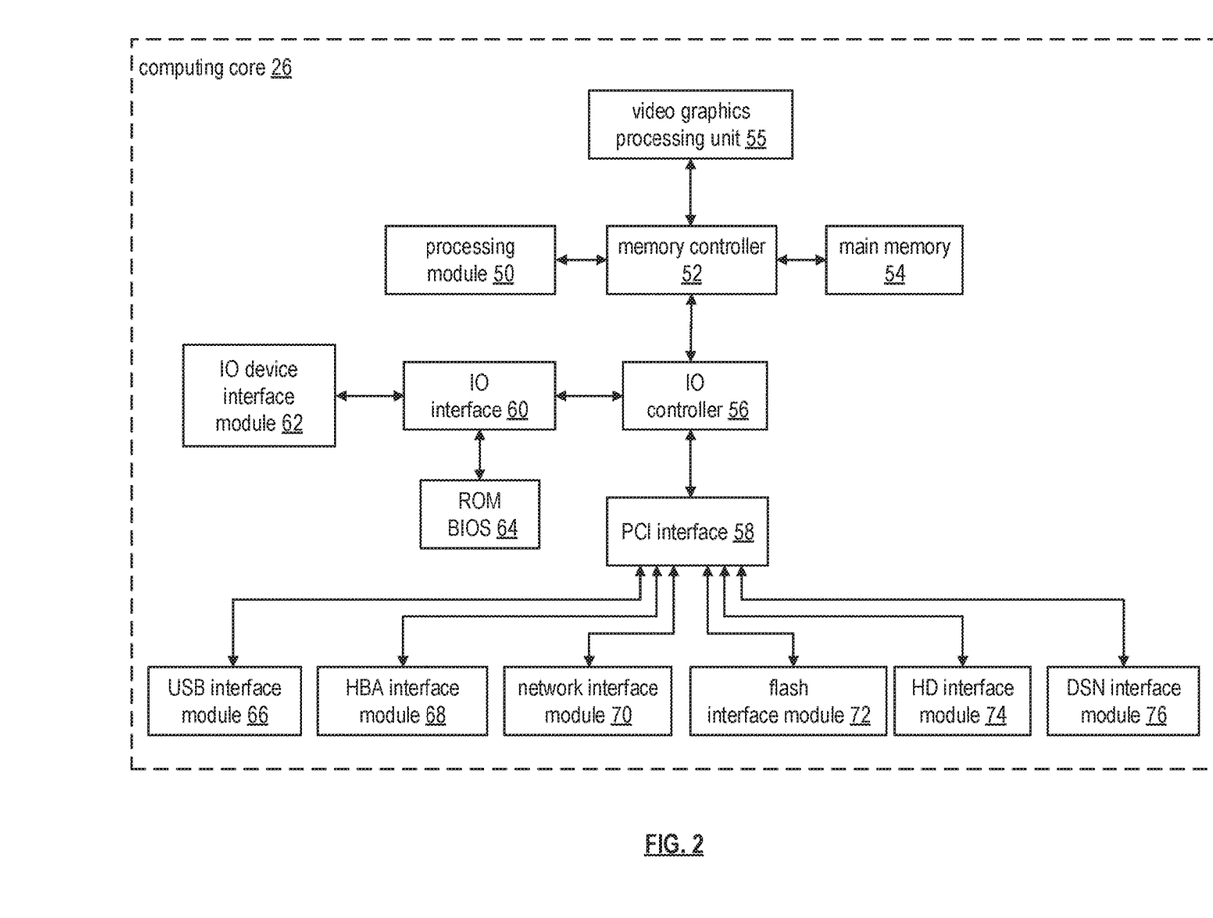
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks (e.g., rebuilding of data slices, updating hardware, rebooting software, restarting a particular software process, performing an upgrade, installing a software patch, loading a new software revision, performing an off-line test, prioritizing tasks associated with an online test, etc.), etc.

Each of the computing devices 12-16, the managing unit 18, integrity processing unit 20 and (in various embodiments) the storage units 36 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group or class of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation/access requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10. Examples of load balancing, service differentiation and dynamic resource selection for data access operations are discussed in greater detail with reference to FIGS. 9-13.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), interne small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figure 3:
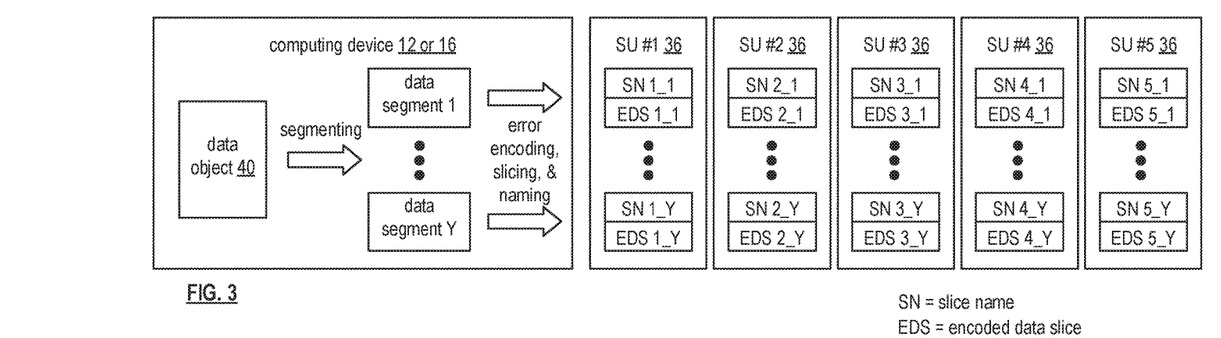
FIG. 3 is a schematic block diagram of an example of dispersed storage error encoding of data in accordance with the present disclosure.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figures 4, 5:
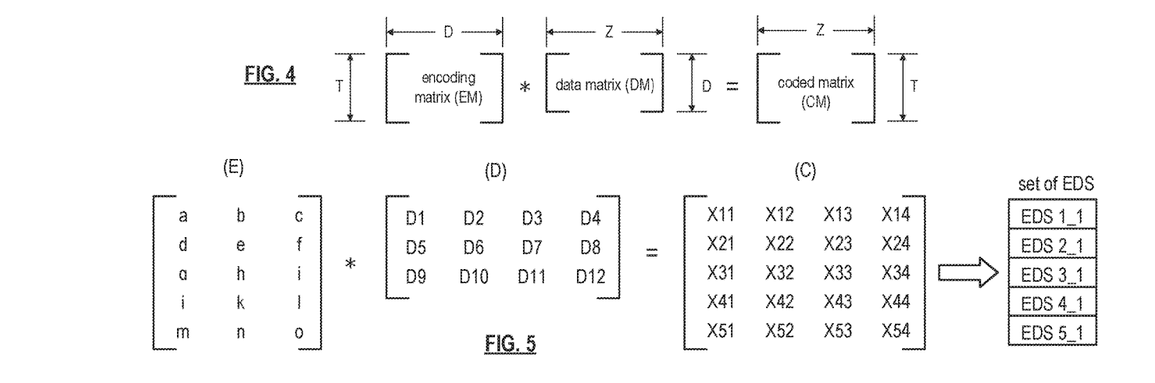
FIG. 4 is a schematic block diagram of a generic example of an error encoding function in accordance with the present disclosure.
FIG. 5 is a schematic block diagram of a specific example of an error encoding function in accordance with the present disclosure.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD 1+bD 5+cD 9, X12=aD2+bD6+cD10, . . . X53=mD3+nD7+oD11, and X54=mD4+nD8+oD12.

Figure 6:
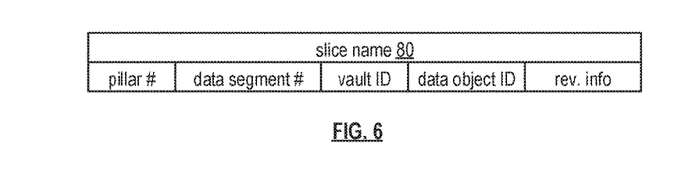
FIG. 6 is a schematic block diagram of an example of slice naming information for an encoded data slice (EDS) in accordance with the present disclosure.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
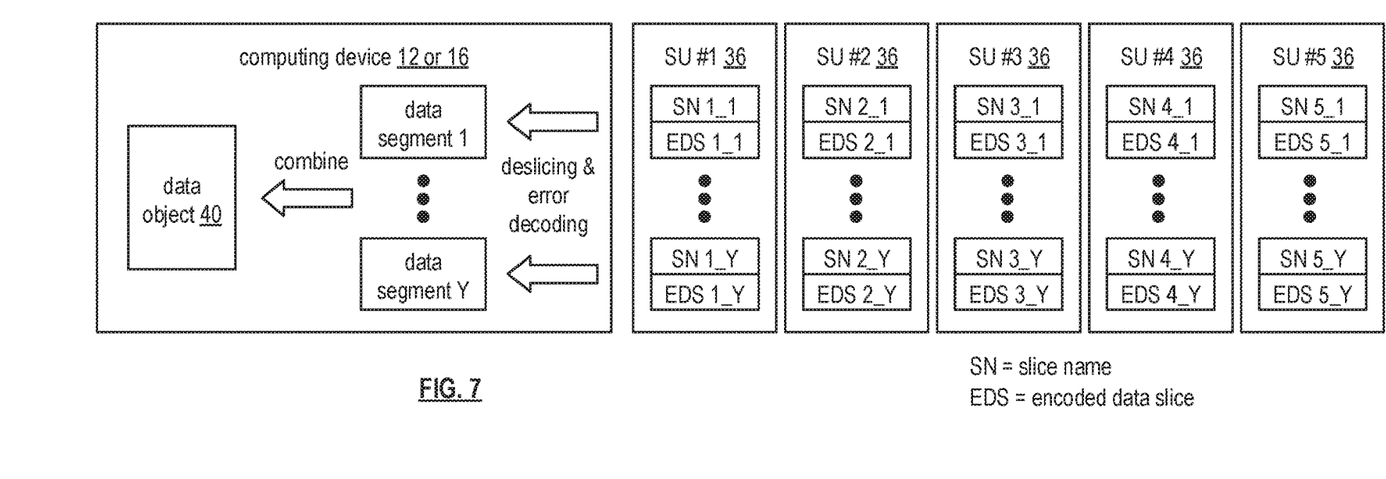
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
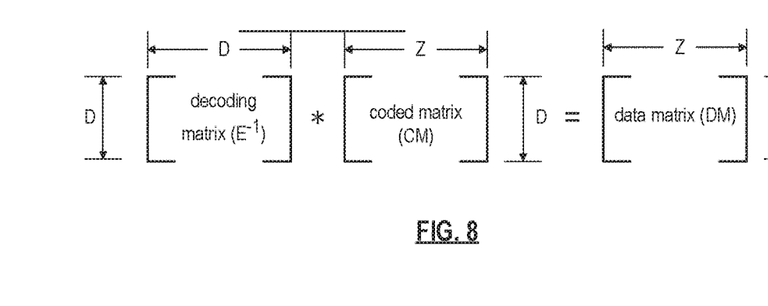
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In general, DSN memory stores a plurality of dispersed storage (DS) error encoded data. The DS error encoded data may be encoded in accordance with one or more examples described with reference to FIGS. 3-6, and organized (for example) in slice groupings or pillar groups. The data that is encoded into the DS error encoded data may be of any size and/or of any content. For example, the data may be one or more digital books, a copy of a company's emails, a large-scale Internet search, a video security file, one or more entertainment video files (e.g., television programs, movies, etc.), data files, and/or indexing and key information for use in dispersed storage operations.

Figure 9:
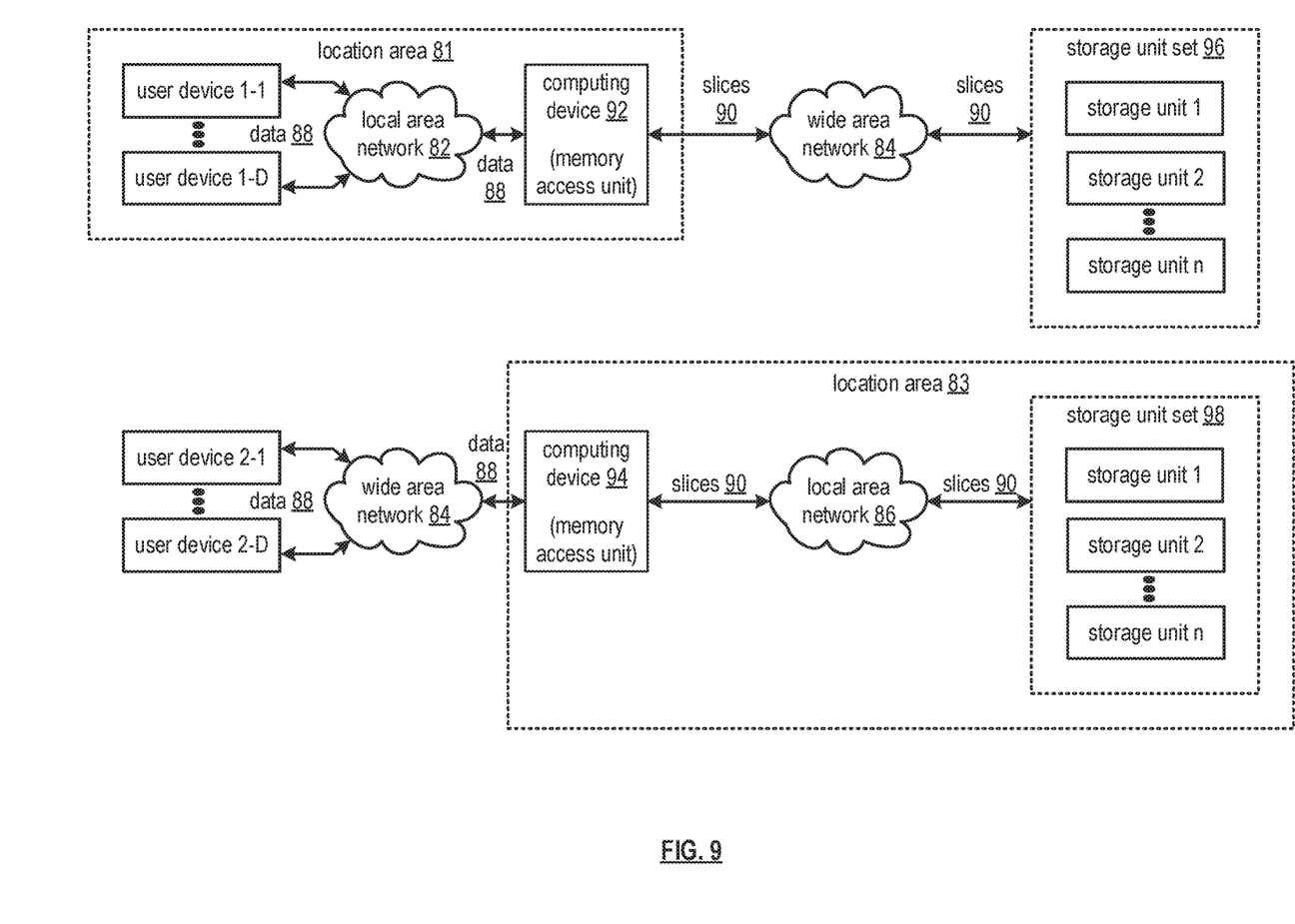
FIG. 9 is a schematic block diagram of another example of a DSN performing automated deployment of access devices and related resource assignments in accordance with the present disclosure.

FIG. 9 is a schematic block diagram of another example of a DSN performing automated deployment of access devices and related resource assignments in accordance with the present disclosure. The illustrated DSN includes a plurality of user devices 1-1 through 1-D associated with a first location area 81, a local area network 82 associated with the location area 81, a computing device (also referred to herein as an "access unit" or a "memory access unit") 92 associated with the location area 81, a wide area network 84, a storage unit set 96, another plurality of user devices 2-1 through 2-D, a computing device 94 associated with a second location area 83, another local area network 86 associated with the location area 83, and a storage unit set 98 associated with the location area 83. The user devices may be implemented, for example, utilizing at least one of the computing device 12 and the computing device 14 of FIG. 1. Each local area network 82, 86 may be implemented utilizing a local portion of the network 24 of FIG. 1. The wide area network 84 may be implemented utilizing a wide area portion of the network 24 of FIG. 1. Each computing device 92 and 94 may be implemented utilizing the computing device 16 of FIG. 1.

Each storage unit set 96 and 98 includes a set of storage units 1-n. Each storage unit may be implemented utilizing the storage unit 36 of FIG. 1, and each of the storage units includes a DS client module 34, a processing module and memory (not separately illustrated). Alternatively, at least some storage units of the storage unit set 98 may be affiliated with location area 81 and/or a third location area (not separately illustrated). In another example, the storage unit sets 96 and 98 may be implemented utilizing a common storage unit set. Generally, location areas include storage units and modules within a proximal distance of one another (e.g., implemented at a common site of the DSN). The DSN functions to optimize utilization of the DSN resources, where the DSN resources include the memory access units and storage unit sets.

For example, when new vaults (e.g., public or private storage vaults) are created in the DSN, or as new memory access units are added or re-deployed, an automated process may operate to determine or assign which vaults are supported and serviced by respective memory access units. Assignment of vaults to memory access units may involve several considerations, including an originating location or region for typical (or expected) access requests to a given vault, wherein local memory access units may be assigned to support a common class of user devices in such regions. In another example, the number of unique locations accessing a vault is determined, and memory access units proximate such locations (or added to such locations) may be assigned to the vault. In yet another example, assignment of vaults to memory access units is based, at least in part, on load factors, such that a heavily utilized memory access unit may be assigned fewer or less active vaults and/or user devices. Alternatively, the number of memory access units assigned to a vault may be adjusted if the vault is over-utilized or under-utilized. Further, the location of storage resources associated with a vault may be determined and utilized to associate memory access units (e.g., vaults that utilize a common set of storage units may be assigned to the same memory access units).

Optimizing the utilization of DSN resources may be based on locality (e.g., to reduce network costs), performance (e.g., locating memory access units proximate to associated storage sets), security (e.g., locating a memory access unit proximate to a common class of user devices utilizing a vault assigned to the memory access unit), a balancing of performance and security, and/or other attributes or requirements characteristics of the DSN.

In an example of operation, a managing unit of the DSN (such as the managing unit 18 of FIG. 1 or, e.g., one or more computing devices or an authorized user device of the DSN) obtains DSN configuration information relating to the memory access units and storage units of the DSN. The DSN configuration information includes one or more of a DSN asset list (e.g., a list of computing devices, memory access units, storage units, and/or other relevant devices (collectively referred to herein as "DSN assets")), an expected user device list, system topology information, and DSN asset capability information. Obtaining the DSN configuration information may include at least one of interpreting system registry information, interpreting a query response(s), and performing a lookup.

Having obtained the DSN configuration information, the managing unit obtains DSN capability information relating to performance characteristics of the memory access units and storage units of the DSN, where the DSN capability information includes one or more of access performance information, processing performance information, storage performance information, and storage capacity information. Obtaining the DSN capability information may include one or more of interpreting a test result, interpreting a query response, and interpreting the system registry information.

Having obtained the DSN capability information, the managing unit identifies a common class of user devices that share one or more substantially identical DSN engagement characteristics, where the DSN engagement characteristics may include one or more of data content access requirements, security of data access requirements, access performance requirements, and topology information. Identifying the common class of user devices may include one or more of interpreting historical data access records, interpreting a request, interpreting the system registry information, identifying physical locations, and identifying networking access capabilities. For example, the managing unit identifies a first common class of user devices to include the user devices 1-1 through 1-D when the user devices 1-1 through 1-D are each affiliated with the location area 81 and share high data security requirements. As another example, the managing unit identifies a second class of user devices to include the user devices 2-1 through 2-D when the user devices 2-1 through 2-D share a common high-performance access requirement.

Having identified the common class of user devices, the managing unit selects a memory access unit (e.g., a computing device 92 or 94) to associate with the identified common class of user devices based on one or more of the DSN configuration information, the DSN capability information, and the substantially identical DSN engagement characteristics. Selecting a memory access unit may include matching a memory access unit to the identified common class of user devices to maximize achievement of the requirements characteristics of the user devices (e.g., as might be determined from the DSN engagement characteristics) and/or common requirements characteristics of the DSN. For example, the managing unit selects the computing device 92 as the memory access unit for the user devices 1-1 through 1-D when the (local) user devices 1-1 through 1-D require relatively secure data access to the memory access unit. As another example, the managing unit selects the computing device 94 as the memory access unit for the user devices 2-1 through 2-D when the user devices 2-1 through 2-D require bandwidth efficiency of access from the memory access unit to the DSN memory (e.g., the storage unit set 98).

Having selected the memory access unit, the managing unit facilitates utilization of the selected memory access unit by the identified common class of user devices. Facilitating utilization of the selected memory access unit may include one or more of issuing an association indicator to user devices of the identified common class of user devices that associates the selected memory access unit (and/or a DSN vault that is accessible to the user devices via the selected memory access unit) with a common class of user devices, and utilizing, by the user devices of a common class of user devices, the selected memory access unit in conjunction with an associated storage unit set. In addition, the processing module may issue a command to associate the selected memory access unit with a specific vault (e.g., a vault assigned to or utilized by user devices of the identified common class of user devices) or location as part of the memory access unit selection process.

For example, the user devices 1-1 through 1-D access data 88, via the local area network 82 of the location area 81 and the computing device 92, to gain access to slices 90, via the wide area network 84, of the storage unit set 96. As another example, the user devices 2-1 through 2-D access the data 88, via the wide area network 84, the computing device 94 to gain access to the slices 90, via the local area network 86 of the location area 83, of the storage unit set 98. In one example, the memory access unit issues a request for access to vaults that may be able to effectively service an identified common class of user devices. Various of the foregoing operations may be repeated periodically on a scheduled basis, or in response to one or more other triggering events, such as creation of a new DSN vault, addition of a DSN asset(s), relocation of a DSN asset(s), reconfiguration of a DSN asset(s), or an upgrade to a DSN asset(s). Other triggering events may include, for example, a change in the DSN engagement characteristics of one or more user devices or a common class of user devices, such as a change in the type of data accessed by a user device(s) or a change in the location area of a user device(s).

Figure 10:
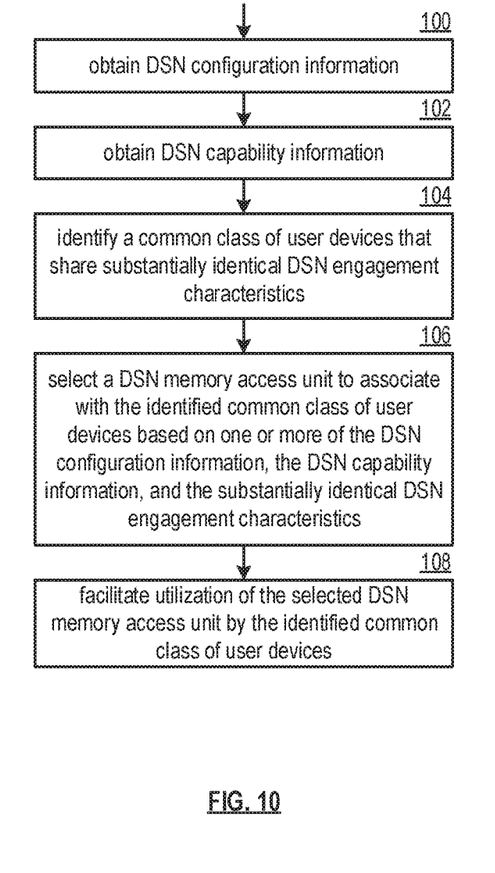
FIG. 10 is a logic diagram illustrating an example of optimizing utilization of DSN resources in accordance with the present disclosure.

FIG. 10 is a logic diagram illustrating an example of optimizing utilization of DSN resources in accordance with the present disclosure. The method includes step 100 where a processing module (e.g., of a managing unit, computing device, or authorized user device) obtains DSN configuration information relating to the memory access units and storage units of the DSN. Obtaining the DSN configuration information includes at least one of interpreting system registry information, interpreting a query response, and receiving the DSN configuration information. The method continues at step 102 where the processing module obtains DSN capability information relating to performance characteristics of the memory access units and storage units of the DSN. Obtaining the DSN capability information may include at least one of interpreting a test result, interpreting a query response, interpreting the system registry information, interpreting an error message, and interpreting a historical capability record.

The method continues at step 104 where the processing module identifies a common class of user devices that share substantially identical DSN engagement characteristics. Identifying a common class of user devices includes at least one of interpreting a historical data access record, interpreting a data access request, interpreting the system registry information, identifying locations associated with the user devices, identifying networking access capabilities, and identifying the DSN engagement characteristics.

The method continues at step 106 where the processing module selects a memory access unit of the DSN to associate with the identified common class of user devices based on one or more of the DSN configuration information, the DSN capability information, and the substantially identical DSN engagement characteristics. Selecting the memory access unit may include selecting an optimal match of a memory access unit to the identified common class of user devices to maximize achievement of the requirements characteristics of the user devices and/or common requirements characteristics of the DSN. The method continues at step 108 where the processing module facilitates utilization of the selected memory access unit by the identified common class of user devices. For example, the processing module issues an indication of the association to the common class of user devices, and the common class of user devices utilizes the selected memory access unit.

Various of the foregoing steps may be repeated periodically on a scheduled basis, or in response to one or more other triggering events, such as creation of a new DSN storage vault, addition of a DSN asset(s), relocation of a DSN asset(s), reconfiguration of a DSN asset(s), or an upgrade to a DSN asset(s). Other triggering events may include, for example, a change in the DSN engagement characteristics of one or more user devices or a common class of user devices, such as a change in the type of data accessed by a user device(s) or a change in the location area of a user device(s).

The methods described above in conjunction with a managing unit and computing devices can alternatively be performed by other modules (e.g., DS client modules 34) of a dispersed storage network or by other devices (e.g., user devices, integrity processing unit 20, etc.). Any combination of a first module, a second module, a third module, a fourth module, etc. of the computing devices and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information. A computer readable memory/storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
    obtaining DSN configuration information regarding one or more memory access units and one or more storage units of the DSN;
    obtaining DSN capability information relating to performance characteristics of the one or more memory access units and the one or more storage units;
    identifying a common class of user devices that share at least one substantially identical DSN engagement characteristic;
    selecting a memory access unit of the one or more memory access units to associate with the identified common class of user devices based on one or more of the DSN configuration information, the DSN capability information, or the at least one substantially identical DSN engagement characteristic; and
    issuing an association indicator to user devices of the identified common class of user devices that associates the selected memory access unit with the user devices of the identified common class of user devices.

2. The method of claim 1, further comprising:
    issuing a command to associate the selected memory access unit with a specific storage vault utilized by the identified common class of user devices.

3. The method of claim 1, wherein the DSN configuration information includes at least one of:
    a DSN asset list;
    an expected user device list;
    system topology information; or
    DSN asset capability information.

4. The method of claim 1, wherein obtaining the DSN configuration information includes at least one of:
    interpreting system registry information;
    interpreting one or more query responses; or
    receiving the DSN configuration information from a computing device of the DSN.

5. The method of claim 1, wherein the DSN capability information includes at least one of:
    access performance information;
    processing performance information;
    storage performance information; or
    storage capacity information.

6. The method of claim 1, wherein obtaining the DSN capability information includes at least one of:
    interpreting a test result;
    interpreting one or more query responses; or
    interpreting system registry information.

7. The method of claim 1, wherein the at least one substantially identical DSN engagement characteristic includes at least one of:
    data content access requirements;
    security of data access requirements;
    access performance requirements; or
    topology information.

8. The method of claim 1, wherein identifying a common class of user devices that share at least one substantially identical DSN engagement characteristic includes at least one of:
    interpreting historical data access records;
    interpreting a request;
    interpreting system registry information;
    identifying physical locations; or identifying networking access capabilities.

9. The method of claim 1, the method initiated upon detection of a triggering event, by the one or more processing modules, wherein a triggering event includes at least one of:
   creation of a new storage vault;
   addition of a DSN asset;
   relocation of a DSN asset;
   reconfiguration of a DSN asset;
   an upgrade to a DSN asset;
   a scheduled time;
   a change in a type of data accessed by a user device; or
   a change in a location of a user device.

10. The method of claim 1, wherein user devices of the identified common class of user devices share a common local area network.

11. A managing unit of a dispersed storage network (DSN), managing unit comprises:
   a network interface;
   a local memory; and
   a processing module operably coupled to the network interface and the local memory, wherein the processing module is configured to:
      obtain, via the network interface, DSN configuration information regarding one or more memory access units and one or more storage units of the DSN;
      obtain, via the network interface, DSN capability information relating to performance characteristics of the one or more memory access units and the one or more storage units;
      identify, via the network interface, a common class of user devices that share at least one substantially identical DSN engagement characteristic;
      select a memory access unit of the one or more memory access units to associate with the identified common class of user devices based on one or more of the DSN configuration information, the DSN capability information, or the at least one substantially identical DSN engagement characteristic; and
      issue, via the network interface, an association indicator to user devices of the identified common class of user devices that associates the selected memory access unit with the user devices of the identified common class of user devices.

12. The managing unit of claim 11, wherein the processing module is further configured to:
   issue, via the network interface, a command to associate the selected memory access unit with a specific storage vault utilized by the identified common class of user devices.

13. The managing unit of claim 11, wherein the DSN configuration information includes at least one of:
   a DSN asset list;
   an expected user device list;
   system topology information; or
   DSN asset capability information.

14. The managing unit of claim 11, wherein obtaining the DSN configuration information includes at least one of:
   interpreting system registry information;
   interpreting one or more query responses; or
   receiving the DSN configuration information from a computing device of the DSN.

15. The managing unit of claim 11, wherein the DSN capability information includes at least one of:
   access performance information;
   processing performance information;
   storage performance information; or
   storage capacity information.

16. The managing unit of claim 11, wherein obtaining the DSN capability information includes at least one of:
   interpreting a test result;
   interpreting one or more query responses; or
   interpreting system registry information.

17. The managing unit of claim 11, wherein the at least one substantially identical DSN engagement characteristic includes at least one of:
   data content access requirements;
   security of data access requirements;
   access performance requirements; or
   topology information.

18. The managing unit of claim 11, wherein identifying a common class of user devices that share at least one substantially identical DSN engagement characteristic includes at least one of:
   interpreting historical data access records;
   interpreting a request;
   interpreting system registry information;
   identifying physical locations; or
   identifying networking access capabilities.

19. The managing unit of claim 11, wherein the processing module is further configured to detect a triggering event, wherein a triggering event includes at least one of:
   creation of a new storage vault;
   addition of a DSN asset;
   relocation of a DSN asset;
   reconfiguration of a DSN asset;
   an upgrade to a DSN asset;
   a scheduled time;
   a change in a type of data accessed by a user device; or
   a change in a location of a user device.

20. The managing unit of claim 11, wherein user devices of the identified common class of user devices share a common local area network.

* * * * *